US 6,569,966 B1

(12) United States Patent
Šindelář et al.

(10) Patent No.: US 6,569,966 B1
(45) Date of Patent: May 27, 2003

(54) METHOD OF PREPARATION OF ETHYLENE COPOLYMERS SUITABLE FOR MANUFACTURING FILMS AND PIPES

(75) Inventors: Pavel Šindelář, Brno (CZ); Martin Havránek, Brno (CZ); Zdenek Salajka, Holubice (CZ); Pavel Pešta, Litvinov (CZ); Květoslava Štěpánková, Lelekovice (CZ); Ladislav Jansa, Teplice (CZ)

(73) Assignee: Polymer Institute Brno, Spol. S.R.O. & Chemopetrol, A.S. (CZ)

( * ) Notice: Subject to any disclaimer, the term of this patent is extended or adjusted under 35 U.S.C. 154(b) by 0 days.

(21) Appl. No.: 09/719,117
(22) PCT Filed: Apr. 5, 2000
(86) PCT No.: PCT/CZ00/00023
§ 371 (c)(1), (2), (4) Date: Jan. 30, 2001
(87) PCT Pub. No.: WO00/61645
PCT Pub. Date: Oct. 19, 2000

(30) Foreign Application Priority Data

Apr. 8, 1999 (CZ) ............................................... 1219-99

(51) Int. Cl.⁷ .......................... C08F 210/16; C08F 4/69
(52) U.S. Cl. ................... 526/169; 526/129; 526/130; 526/172; 526/348; 502/115; 502/120
(58) Field of Search ........................ 526/129, 130, 526/169, 172, 348; 502/115, 120

(56) References Cited

U.S. PATENT DOCUMENTS

| | | | |
|---|---|---|---|
| 3,324,095 A | | 6/1967 | Karapinka |
| 3,790,550 A | | 2/1974 | Miller |
| 3,984,351 A | * | 10/1976 | Rekers et al. |
| 4,003,712 A | | 1/1977 | Miller |
| 5,137,994 A | | 8/1992 | Goode et al. ................. 526/75 |
| 5,625,012 A | | 4/1997 | Hussein et al. |

FOREIGN PATENT DOCUMENTS

| | | |
|---|---|---|
| DE | 294719 A5 | 10/1991 |
| EP | 0808849 | 11/1997 |
| GB | 2086403 | 5/1982 |
| WO | 9217511 | 10/1992 |
| WO | 9909075 | 2/1999 |

* cited by examiner

*Primary Examiner*—Caixia Lu
(74) *Attorney, Agent, or Firm*—Ostrolenk, Faber, Gerb & Soffen, LLP

(57) ABSTRACT

Method of preparation of ethylene copolymers suitable for manufacturing films or pipes so characterized that for the initiation of polymerization of ethylene and 1-alkene monomer a substantially innovated catalyst system containing silyl chromate compound is used. The catalyst system, containing a high yield structure A,

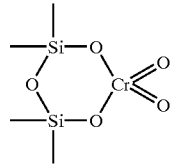

(A)

is prepared by a sequential interaction of the following components: a) a silyl chromate compound completely freed from water and oxygen prior to its contact with the porous support, b) a support containing a suitable type and optimum concentration of hydroxyl groups, and c) an alkylating agent, being a combination of organometal compounds of aluminum $(RO)AlR_2$ and magnesium $(R^1MgR^2)$, the ratios between the components in the catalyst vary in the following ranges: content of silyl chromate on the support varies from 0.05 to 0.35% of the support weight, ratio between the total amount of organometals (ORG) to silyl chromate (expressed in terms of ORG/Cr) varies between 0.5 and 20, and the mutual ratio of organoaluminum compound and organomagnesium compound Al:Mg varies between 10:0.1 and 0.1:10.

7 Claims, 1 Drawing Sheet

METHOD OF PREPARATION OF ETHYLENE COPOLYMERS SUITABLE FOR MANUFACTURING FILMS AND PIPES

FIELD OF THE INVENTION

The present invention pertains to the method of production of ethylene copolymers suitable for manufacturing films and pipes using supported catalysts containing chromic acid esters.

DESCRIPTION OF THE RELATED ART

Basic types of catalysts based on chromates provide mostly polymers with low melt flow rates and broad molecular weight distribution. These catalyst systems for ethylene polymerization were disclosed in U.S. Pat. Nos. 3,324,101 and 3,324,095. According to the quoted patents, the supported catalyst system is prepared as follows: a silyl chromate compound is anchored to the surface of a support, typically activated silica (being activated at a temperature between 100 and 900° C. for 2 to 6 hours) in an aliphatic hydrocarbon, then an organoaluminium compound is added at an Al/Cr ratio between 0.1:1 and 15:1. According to the examples presented in the above patents the catalyst produces, at an ethylene pressure of 1.33 atm at a temperature between 60 and 90° C. and at a hydrogen pressure of 1.3 atm, a polymer with melt flow rate in a range of 0.04–1.57 dg/min (at 21.6 N load) and exhibits a very broad molecular weight distribution reflected in $MFR_{216}/MFR_{21.6}$ between 100 and 170. If a 1-alkene comonomer is used, a copolymer is prepared, exhibiting—depending on polymerization conditions—density in a range of 0.938–0.956 $g/cm^3$. The polymer thus prepared is probably designed to be used for manufacturing films or pipes employed in distribution systems for hot and cold water and pressurized natural gas.

In EP 0 454 434 Patent a procedure for preparing a new silyl chromate component was disclosed which is used for preparation of a catalyst system employed for polymerization of 1-alkenes. The procedure of the catalyst preparation, including the polymerization condition, is identical to the above-quoted U.S. Pat. Nos. 3,324,101 and 3,324,095. The catalyst produces (at 95 C and in the presence of hydrogen) a polymer with melt flow ratio in the range of 1–6 dg/min. and exhibits a medium-to-very wide molecular weight distribution.

In CZ 285 446 Patent a procedure for preparing polymers with a high melt flow rate and a narrow molecular weight distribution was disclosed using a catalyst system containing a silyl chromate component. A principle of the procedure is a modified method of preparation of the catalyst in which the type and concentration of hydroxyl groups on the silica surface provide formation of active centers with linear structure. This type of active center prefers transfer reactions on account of copolymerization, if 1-alkene monomers are polymerized.

Catalysts based on chromates produce polymers with a high content of internal C=C double bonds (vinylidene, vinylene) and low content of so called "tie molecules"— branch polymer chains of high molecular weight— providing good long-term mechanical properties. Taking account of these shortcomings, the polymers are unable to meet increasing demands on polymer quality; therefore the polymers for more demanding applications are prepared using new types of catalyst systems or novel procedures for polymer preparation. These systems or polymerization procedures can control more efficiently the structure of the polymer matrix. The catalyst systems belonging to this group should ideally be chromium oxide systems; the basic version was disclosed in U.S. Pat. No. 2,825,721. A novel procedure of the polymer preparation is a process with a cascade of two reactors where, e.g., a slurry polymerization in the first reactor is followed by a gas-phase polymerization in the second reactor.

SUMMARY OF THE INVENTION

According to the present invention, a procedure of preparation of ethylene copolymer suitable for film or pipe applications is provided, using a substantially innovated catalyst system containing chromic acid esters. Utilization of this catalyst system allows preparation of copolymers with a high content of high molecular weight chains, with an optimum degree of branching providing an efficient interlining of crystalline and amorphous phases of polymer. According to the present invention, we have found a novel efficient procedure of preparation of a suitable type of active catalyst able to prepare the type of polymer required. The principle of preparing a copolymer suitable for manufacturing pipes or films consists in modification of conditions of the active center formation selected so that after interaction of:

a) silyl chromate of general formula I being suspended prior to contact with a support in an aliphatic hydrocarbon in the temperature range of 0–80° C. and bubbled by an ultra-pure nitrogen

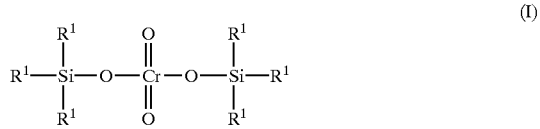
(I)

wherein $R^1$ is an aliphatic, cyclic or aromatic hydrocarbon group containing from 1 to 20 carbon atoms, b) porous supporting material with surface acidic hydroxyl groups, their concentration and character being modified prior to the interaction by thermal treatment, an intermediate was formed in a high yield of a structure A

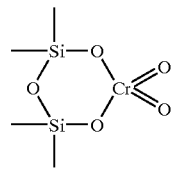
Structure A as a result of hydrolysis of two ester groups in silyl chromate exclusively by hydroxyl groups of the support and the intermediate A after reduction by c) alkylating agent, an organoaluminium compound of general formula II

(II), combined with an organomagnesium compound of general formula III

(III), wherein $R^2$, $R^3$, and $R^4$ are aliphatic, cyclic or aromatic hydrocarbon groups containing from 1 to 20 carbon atoms, said hydrocarbon groups being the same or different, a and b are integers from 0 to 3, provided an active center with an enhanced ability to enchain a 1-alkene comonomer, particularly in the high molecular weight fraction of polymer, as compared to the existing catalysts, while ratios between the components in the catalyst vary in the following ranges: content of silylchromate between 0.05 and 1.0 wt. % of the support, the ratio between total amount of organometal (ORG) to silyl chromate, expressed as ORG/Cr varies between 0.5 and 20 and the ratio between organoaluminium and organomagnesium compounds expressed as Al:Mg varies from 10:0.1 to 0.1:10.

In a preferable procedure for preparing the catalyst system according to the present invention, the support is solid porous material, such as silica.

In a preferable procedure for preparing the catalyst system according to the present invention, the silica activation process is conducted so that apart from the isolated hydroxyl groups the support also contains vicinal ones, the latter OH groups making possible formation of the species depicted in Structure A. This structure after alkylation is a source of polymerization active centers.

In a preferable procedure for preparing the catalyst system according to the present invention, it is highly desirable to avoid the presence of water, particularly during the interaction of chromate with hydroxyl groups of silica.

In a preferable procedure for preparing the catalyst system according to the present invention, the silyl chromate compound is alkylated by $RO_xAlR_{3-x}$ first and then by $R_2Mg$ compound or simultaneously by their mixture.

In a preferable procedure for preparing the catalyst system according to the present invention, the organoaluminium compound is $Et_2AlOEt$ and the organomagnesium compound is butyloctylmagnesium.

The advantages of preparation of the catalyst system according to the present invention follow from the fact that the selected procedure of the catalyst system preparation provides active centers in a high yield, the centers utilizing a comonomer preferentially to short-chain branching, particularly in the higher-molecular-weight polymer fraction. This, in turn, decreases occurrence of transfer reactions with a comonomer resulting in a lower content of unsaturated C=C double bonds and thus, in a lower appearance of low molecular weight highly branched polymer chains. These changes are beneficial in limiting undesirable reactions during polymer processing. The catalyst containing organomagnesium compound exhibits higher activity and higher stability during the polymerization process.

The advantages of the preparation of ethylene copolymers according to the present invention in comparison with the standard procedure are illustrated in the diagrams (FIGS. 1 and 2) where the copolymer structure is presented as fractions with a certain molecular weight and certain number of branches. The abbreviation "log M" means the decadic logarithm of molecular weight, while "$CH_3/1000C$" means the number of branches per 1000 carbon atoms in the polymer backbone.

Further advantages of the catalyst system according to the present invention are seen in the simple and fast procedure of the catalyst system preparation both in the laboratory and in a commercial plant. Also, standard methods and facilities can be used. The polymerization activity of the present catalyst system is very high. The catalysts react sensitively to the comonomer employed and, hence, polymers with widely varying density can be prepared.

DETAILED DESCRIPTION OF THE INVENTION

Figure 1:
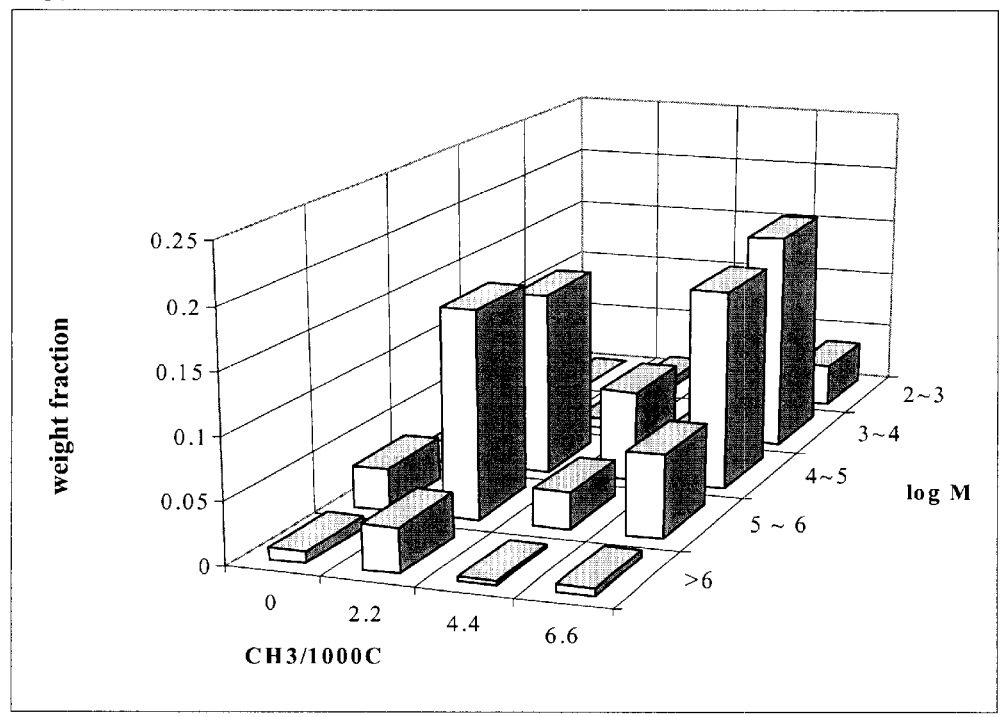
FIG. 1 shows the polymer prepared according to the present invention containing a substantial portion of high-molecular-weight copolymer.
Figure 2:
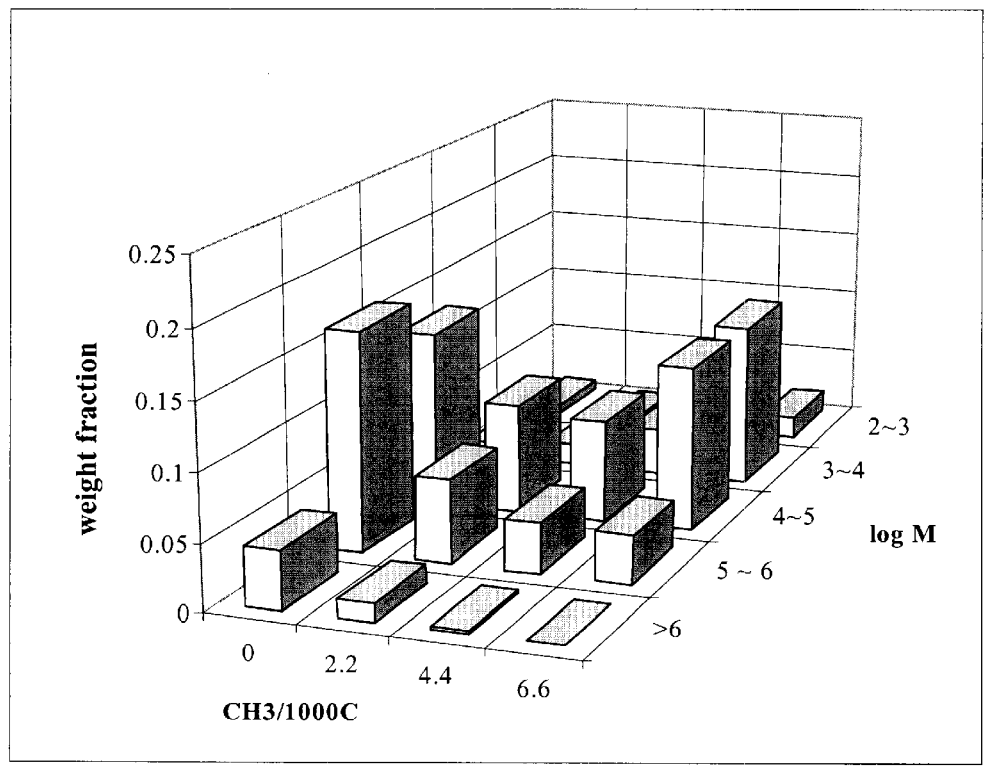
FIG. 2 shows the copolymer prepared using a standard procedure for catalyst system preparation. It is obvious that a much higher content of homopolymer was obtained when compared to the copolymer in FIG. 1.

The catalyst components or their reaction products are anchored to the support surface. According to the present invention, solid porous material, such as silica can be used. To obtain a good contact of monomer with the catalyst, it is desirable to use a support with a specific surface area between 50 and 1000 $m^2/g$ support. According the present invention, it is highly desirable to remove water and other volatile compounds from the support before interaction with the catalytic components. This is usually done by heat activation of the support in a stream of an inert gas such as nitrogen. As the type of hydroxyl groups present on the support surface after its activation substantially influences the structure of the active center formed and thus also polymer quality, activation of the support has to be carried out correctly.

Research work by the authors of the present invention has revealed that a high efficiency of the catalyst to control polymer density is obtained if the support activation is carried out so that apart from the isolated hydroxyl groups the support also contains vicinal ones, the latter OH groups making possible fonnation of the species depicted in Structure A. As the behavior of hydroxyl groups can be dependent primarily on the support surface area, pore size and shape etc., a precise concentration of hydroxyl groups cannot be specified in general terms. Hence, the results obtained by us using silicas with a specific surface area of 250–320 $m^2/g$ are presented for general information only. A high efficiency in controlling the enchainment of a comonomer into the polymer chain was achieved using silicas containing from 0.8 to 1.25 mmole of all hydroxyl groups per gram, 0.03–0.5 mmole hydroxyl groups per gram out of them being vicinal OH groups. The procedure of the catalyst preparation results in a slight narrowing of the molecular weight distribution of the polymer.

The catalyst system according to the present invention is prepared by a reaction of the component (a) with a porous support referred to as component (b) and then by a reaction with an alkylating agent—component (c).

To obtain the desirable structure of the active center, it is further necessary to carry out the interaction of the chromate with the support in a strict absence of water; the chromate itself should be freed from water and other volatile compounds before use. As for the conditions of the interaction of compounds used for preparation of the catalyst system, it has been found that it is most advantageous to let the components react at temperatures between 20 and 80° C. for an interval from 5 minutes to 10 hours in an inert hydrocarbon (e.g., isopentane, isohexane, pentane, heptane). The catalyst preparation, as well as the charging of the catalyst components, is carried out in an inert gas atmosphere (e.g., nitrogen, argon, helium) freed from moisture and oxygen. The catalyst system prepared according to the present invention is used for the preparation of ethylene copolymers exhibiting density between 938 and 950 kg/$m^3$ and medium-to-wide molecular weight distribution expressed in terms of FFR ranging from 80–120 (FFR refers to ratio of melt-flow rates at two loads, namely 216 and 21.6 N).

As for the component (c) of the catalyst system, organometal compounds of Group IV metals from the Periodic Table of the Elements can be used. The most advantageous is a combination of an organoaluminium of general formula $R^2_3Al$, $R^2_2AlOR$, $R^2AlOR^3_2$ and an organomagnesium compound $R^3_2Mg$, the alkyl groups being either identical or different.

The conditions of ethylene polymerization and its copolymerization with 1-alkene comonomers are not limited. Polymerization of ethylene in solution, in slurry or in the gas phase can be carried out according to the present invention in a single reactor, in a cascade of reactors in continuous as well in discontinuous modes. If ethylene polymerization is carried out in slurry, the catalyst is dispersed in the reactor in a suitable hydrocarbon, such as propane, butane, isobutane, pentane, isopentane, hexane and heptane. Polymerization is carried out in the temperature range of 60–150° C., most preferentially between 60° C. and 110° C. and at pressures ranging from atmospheric pressure to 4.0 MPa. Standard methods can be used for controlling the molecular weight of the resulting polymer. The most efficient methods of molecular weight control are polymerization temperature, ratio of organoaluminium to organomagnesium compounds (Al/Mg), concentration of Cr on the support surface and concentration of oxygen in the polymerization reactor.

The catalyst system according to the present invention is suitable for copolymerization of ethylene with 1-alkene comonomers, such as propene, 1-butene, 1-pentene, 1-hexene, 4-methyl-1-pentene or 1-octene.

The polymer properties presented in the subsequent examples were assessed according to the following methods:
MFR—the melt-flow rate of polymer was measured in accordance with ASTM 1238-65 at 190° C. and a load of 21.6 N or 216 N.
FRR—flow rate ratio determined at two loads 216 N/21.6 N.
Density—of the polymer samples was measured according to ISO 1183: 1987(E) Standard using flotation of hot-pressed specimens in immersion liquid (ethyl alcohol/water) combined with the pycnometric method.
Structural Analysis SIS/GPC—the assessment of distribution of branches along the polymer chain was carried out using a modified T.R.E.F. (Temperature Raising Elution Fractionation) method. The SIS/GPC principle of polymer analysis is based on the procedure published by B. Monrabal in J. Appl. Polym. Sci., 52, 491 (1994).
Notch Pipe Test—the test method for assessment of slow propagation of crack in a pipe with a notch was used for testing specimens cut from pipes of 63 mm diameter; the test procedure was based on ČSN EN ISO 13 479 Standard.
Pipe Pressure Test—was carried out using pipes of 32 mm diameter according to ISO 1167 Standard.

The following examples illustrate the procedure of the catalyst preparation, including its usage in polymerization. However, they do not exhaustively describe the possibilities of the invention.

EXAMPLE 1 a) Catalyst Preparation

The following components were charged under ultra-pure nitrogen stream into a glass reactor dried thoroughly via evacuation: 40 ml dry hexane, 1.0 g activated silica containing 1.1 mmole OH per gram $SiO_2$ and 31.1 mg impurity-free bis(triphenylsilyl) chromate. The slurry of silica with chromate was stirred in the dark at 45° C. for 4 hours. To the intermediate thus formed were added: 0.196 mmole $Et_2AlOEt$ and 0.392 mmole BuMgOct, making mole ratios Al/Cr=2 and Mg/Cr=4, and the subsequent interaction proceeded with stirring in dark at 45° C. for 4 hours. After the elapsed time, the reactor temperature was increased to 70° C. and the component interaction proceeded at this temperature for 1 hour. After sedimentation of the solid product on the reactor bottom, the superfluous solvent was decanted. The remaining part of the solvent was removed in vacuo. The catalyst thus obtained was a free-flowing greenish powder.

b) Preparation of Ethylene Copolymer

A 1.8 L stainless steel polymerization reactor was used for testing the catalyst system performance. The reactor was equipped with a mechanical stirrer and a jacket for temperature control. The catalyst system prepared according to EXAMPLE 1a was sealed in a thin-wall glass ampoule and the ampoule was fixed in a breaking device placed inside the reactor cover. Then the reactor was brought to polymerization temperature (95° C.) and it was freed from all impurities by repeated pressurizing/depressurizing cycles using ultra-pure nitrogen. Next, 1-hexene and hydrogen were charged to the reactor in quantities corresponding to ratios hydrogen/ethylene=hexene/ethylene=0.03 and then ethylene was charged to reach total pressure in the reactor of 2.1 MPa. The polymerization was initiated by breaking the glass ampoule with the catalyst. Polymerization was carried out for 2 hours, while the relevant quantity of 1-hexene was added ½ hour after the start of polymerization, and ethylene was fed continuously to keep a constant pressure of 2.1 MPa during the whole polymerization. The amount of ethylene consumed during the polymerization and temperature changes were monitored continuously during the whole polymerization. After finishing the polymerization, the polymer obtained was weighed and its properties assessed employing the methods described above. The results are summarized in Table 1.

EXAMPLE 2

The procedure of preparation of ethylene copolymers is identical to EXAMPLE 1 except for silica used and ratios of organoaluminium and organomagnesium compounds to chromium compound (Al/Cr and Mg/Cr).

Comparable Examples 1 Through 3

The procedure of preparation of ethylene copolymers is identical to EXAMPLE 1 except for silica used and ratios of organoaluminium and organomagnesium compounds to chromium compound (Al/Cr and Mg/Cr) and except that bis(triphenylsilyl) chromate was not freed from water and other impurities. All data are collected in Table 1.

EXAMPLE 3 a) Preparation of Catalyst in Pilot Plant

The following components were charged into a stainless steel 50 L reactor completely freed of impurities: dried isopentane (13.3 kg), 4.3 kg activated silica (containing a total of 1.05 mmole $OH/gSiO_2$) and 0.206 mole bis(triphenylsilyl) chromate free of impurities. The slurry was stirred at 45° C. for 4 hours. Next, 0.413 mole $Et_2AlOEt$ was added to the intermediate product and after 2 hours 0.825 mmole BuOctMg. After an additional 2 hours, the major part of solvent (8.5 kg) was removed via filtration and the catalyst was dried at 60° C. for 4 hours.

b) Preparation of Ethylene Copolymer

The catalyst system in a free-flowing powdery form was fed from the catalyst charger using nitrogen overpressure into the bottom part of the pilot plant reactor. Polymerization proceeded in a fluidized bed containing the polymer powder and the catalyst. The bed fluidization was secured by a gas flow, a mixture of monomer, comonomer and hydrogen. The following ranges of stationary state were used in the continuous reactor: pressure from 1.8 to 2.0 MPa, temperature from 70 to 100° C., and mole ratios shown in Table 1. The polymer produced was removed from the reactor discontinuously, depending on the polymerization rate. The reactor productivity depends on residence time in the reactor (between 2 and 8 hours), on the efficiency of cooling the recycling mixture of monomers and on the activity and concentration of the catalyst used.

EXAMPLES 4 THROUGH 6

The procedure of preparation of ethylene copolymer is identical to EXAMPLE 3 except for the Cr-compound alkylation which was carried out at different ratios of organometal compounds. Also, different polymerization conditions (shown in Table 1) were employed.

Comparable Example 4

The procedure of preparation of ethylene copolymers is identical to EXAMPLE 3 except that only organoaluminium compound $Et_2AlOEt$ was used for alkylation of Cr-compound.

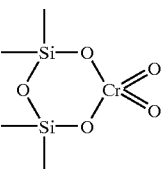
(A)

as the result of hydrolysis of two ester groups of silyl chromate exclusively by the effect of hydroxyl groups of the support and the intermediate A is further reduced by c) alkylating agent, being:
   organoaluminium compounds of general formula II

TABLE 1

| Example | $\Sigma c_{OH}$[a] (mmole/g) | Vicinal OH (mmole/g) | $R_2Mg$ (mmole/g) | Al/Cr | Mg/Cr | $C_x$[b] | $C_x/C_2$ | T (° C.) | $MFR_{21,6N}$ dg/min. | FFR | density (kg/m$^3$) | pressure test (hr)[c] | NPT (hr)[d] | stripping of BTFSC |
|---|---|---|---|---|---|---|---|---|---|---|---|---|---|---|
| 1 | 1.1 | 0.2 | BOMAG | 2 | 4 | hexene | 0.03 | 95 | 0.12 | 112 | 941.7 | — | — | yes |
| 2 | 1.1 | 0.2 | BOMAG | 3 | 3 | hexene | 0.03 | 95 | 0.14 | 105 | 942.6 | — | — | yes |
| Comparable 1 | 1.1 | 0.2 | — | 6 | — | hexene | 0.03 | 95 | 0.16 | 96 | 944.7 | — | — | yes |
| Comparable 2 | 1.1 | 0.2 | BOMAG | 2 | 4 | hexene | 0.03 | 95 | 0.17 | 135 | 945.8 | — | — | no |
| Comparable 3 | 0.67 | 0.05 | BOMAG | 2 | 4 | hexene | 0.03 | 95 | 0.26 | 86.7 | 947.6 | — | — | yes |
| 3 | 1.09 | 0.2 | BOMAG | 2.7 | 3.7 | butene | 0.04 | 98 | 0.09 | 114 | 939.7 | 882 | 560 | yes |
| 4 | 1.09 | 0.2 | BOMAG | 2.7 | 3.7 | butene | 0.04 | 101 | 0.11 | 99.5 | 937.8 | 1315 | 1000 | yes |
| 5 | 1.09 | 0.2 | BOMAG | 3.5 | 2.6 | butene | 0.04 | 96.5 | 0.096 | 121 | 940.1 | 1319 | 591 | yes |
| 6 | 1.09 | 0.2 | BOMAG | 3.5 | 2.6 | butene | 0.04 | 100 | 0.14 | 106 | 939.7 | 1149 | 1070 | yes |
| Comparable 4 | 1.09 | 0.2 | — | 4.5 | — | butene | 0.03 | 92 | 0.16 | 107 | 946.8 | 447 | 350 | yes |

Notes to Table 1:
[a] total concentration of OH groups,
[b] type of comonomer,
[c] time to fracture in test pipe at $\sigma$ = 4.6 MPa,
[d] NTP - Notch Pipe Test.

What is claimed is:

1. A method for the preparation of ethylene copolymers so characterized that the catalyst used for the ethylene copolymerization is prepared by the interaction of:

a) silyl chromate of general formula I

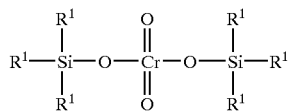
(I)

wherein $R^1$ is an aliphatic, cyclic or aromatic hydrocarbon group containing from 1 to 20 atoms of carbon, which is prior to contact with a porous support suspended in an aliphatic hydrocarbon and is bubbled by ultra-pure nitrogen with b) porous support material, the surface of which is covered by hydroxyl groups, their concentration and nature have been modified prior to interaction by a thermal treatment, forming an intermediate exhibiting structure A $$R^2_a R^3_b Al(OR^4)_{3-(a+b)},\qquad\text{(II)}$$

in combination with organomagnesium compound of general formula III $$R^2 R^3 Mg,\qquad\text{(III)}$$

wherein $R^2$, $R^3$ and $R^4$ are aliphatic, cyclic or aromatic hydrocarbon groups containing from 1 to 20 atoms of carbon, said hydrocarbon groups being identical or different, a and b are integers from 0 to 3, while the ratios between the components in the catalyst vary in the following ranges: content of silyl chromate on the support varies from 0.05 to 1.0% of the support weight, ratio between the total amount of organometals ORG to silyl chromate, expressed in terms of ORG/Cr varies between 0.5 and 20 and the mutual ratio of organoaluminum compound and orgapomagnesium compound Al:Mg varies between 10:0.1 and 0.1:10.

2. Method of preparation of ethylene copolymers according to claim 1 so characterized that the porous material—compound b)—is silica, containing such concentration and type of OH groups in order to provide a hydrolysis of both ester groups and result in formation of an active center anchored to the support surface by two chemical bonds.

3. Method of preparation of ethylene copolymers according to claim 1 so characterized that component a) of the said system is freed from water, oxygen and other undersirable impurities prior to its interaction with the support.

4. Method of preparation of ethylene copolymers according to claim 1 so characterized that polymerization is carried out in the presence of liquid inert hydrocarbon at concentrations of hydrogen 0–50 vol. % and concentration of ethylene or mixture of ethylene with 1-alkene comonomer 50–100 vol. %.

5. Method of preparation of ethylene copolymers according to claim 1 so characterized that polymerization is carried in gas phase in fluidized bed containing 0–50 vol. % hydrogen and 50–100 vol. % 1-alkene, selecting polymerization in the presence of a comonomer or a mixture of comonomers at a temperature from 60 to 150° C. and in the pressure range from atmospheric to 8.0 MPa.

6. Method of preparation of ethylene copolymers according to claim 4 so characterized that the polymerization is carried out in an inert hydrocarbon first and then in the gas phase.

7. Method of preparation of ethylene copolymers according to claim 5 so characterized that the polymerization is carried out in the gas phase in two steps under different conditions.

* * * * *